US011350153B2

(12) United States Patent
Pepper et al.

(10) Patent No.: US 11,350,153 B2
(45) Date of Patent: May 31, 2022

(54) REMOTE CONTROL WITH AUTOMATED AUDIO AND VIDEO SELECTION CONTROL

(71) Applicant: Charter Communications Operating, LLC, St. Louis, MO (US)

(72) Inventors: Andrew Pepper, Little Falls, NY (US); David Countermine, Scotia, NY (US)

(73) Assignee: Charter Communications Operating, LLC, St. Louis, MO (US)

( * ) Notice: Subject to any disclaimer, the term of this patent is extended or adjusted under 35 U.S.C. 154(b) by 30 days.

(21) Appl. No.: 16/839,569

(22) Filed: Apr. 3, 2020

(65) Prior Publication Data
US 2021/0314648 A1  Oct. 7, 2021

(51) Int. Cl.
*H04N 21/422*  (2011.01)

(52) U.S. Cl.
CPC ... *H04N 21/42221* (2013.01); *H04N 21/4221* (2013.01); *H04N 21/42222* (2013.01)

(58) Field of Classification Search
CPC ......... H04N 21/42221; H04N 21/4221; H04N 21/42222
USPC ....................................................... 348/734
See application file for complete search history.

(56) References Cited

U.S. PATENT DOCUMENTS

| | | | | |
|---|---|---|---|---|
| 4,623,887 A * | 11/1986 | Welles, II | ............... | G08C 19/28 340/12.24 |
| 4,626,892 A * | 12/1986 | Nortrup | ........... | H04N 21/47214 348/569 |
| 4,807,052 A * | 2/1989 | Amano | ................... | H04B 1/202 348/734 |
| 5,764,179 A * | 6/1998 | Tsurumoto | ............. | H04N 21/47 341/176 |
| 6,747,568 B1* | 6/2004 | Teskey | ................... | G08C 19/28 340/12.28 |
| 6,781,638 B1* | 8/2004 | Hayes | ................... | G08C 17/00 348/734 |
| 7,230,562 B1* | 6/2007 | Provis | .............. | H04N 21/42226 341/176 |
| 7,339,513 B1* | 3/2008 | Provis | .............. | H04N 21/41265 341/173 |
| 8,253,866 B1* | 8/2012 | Weber | .............. | H04N 21/42206 348/734 |

(Continued)

*Primary Examiner* — John W Miller
*Assistant Examiner* — Sean N. Haiem
(74) *Attorney, Agent, or Firm* — Young Basile Hanlon & MacFarlane, P.C.

(57) ABSTRACT

Disclosed herein are remote controls with automated selection control. A remote control includes a microcontroller with a provisioned infrared remote library, which are programmed with control codes for a content device, a switch, an infrared light emitter, an indicator device, and a delay knob are connected to the microcontroller. The switch is associated with a selection function on the content device and with control codes. The microcontroller and the library, upon selection of a switch position at the switch, control the infrared light emitter to emit repetitive infrared control codes at the content device at a repetition rate responsive to a reaction time for switching the selection function at the content device, the repetitive infrared control codes automatically incrementing or decrementing the selection function at the content device. The delay knob sets the repetition rate. The indicator device indicates emissions from the infrared light emitter.

20 Claims, 7 Drawing Sheets

(56) References Cited

U.S. PATENT DOCUMENTS

| | | | | |
|---|---|---|---|---|
| 2001/0024564 A1* | 9/2001 | Young | H04N 21/42204 | 386/212 |
| 2002/0113895 A1* | 8/2002 | Takagi | H04N 21/4383 | 348/569 |
| 2003/0135854 A1* | 7/2003 | Lee | H04N 21/4532 | 725/38 |
| 2003/0197624 A1* | 10/2003 | Bresin | G08C 23/04 | 340/12.14 |
| 2004/0040039 A1* | 2/2004 | Bernier | H04N 21/84 | 725/46 |
| 2004/0268391 A1* | 12/2004 | Clercq | H04N 21/42204 | 725/37 |
| 2005/0172228 A1* | 8/2005 | Kakuda | G08C 19/28 | 715/234 |
| 2008/0316371 A1* | 12/2008 | Hauck | H04N 21/482 | 348/734 |
| 2010/0123835 A1* | 5/2010 | Ichikawa | H04B 1/202 | 348/734 |
| 2013/0263204 A1* | 10/2013 | Bangor | H04B 1/202 | 725/153 |
| 2015/0033263 A1* | 1/2015 | Hiyoshi | G06F 3/04815 | 725/44 |

* cited by examiner

REMOTE CONTROL WITH AUTOMATED AUDIO AND VIDEO SELECTION CONTROL

TECHNICAL FIELD

This disclosure relates to verification testing. More specifically, this disclosure relates to a remote control which enables automatic sequencing with respect to audio and video selection controls.

BACKGROUND

Service providers need to check or confirm that content being delivered on different channels or applications is being received by subscribers. Each channel is checked for video and audio reception. The testing can be done at a service provider headend, at a subscriber location, and the like. Given the number of available channels, individuals performing the testing are subject to repetitive stress injuries due to having to press the channel up or down button multiple times, the volume up and down button multiple times, and other like buttons.

SUMMARY

Disclosed herein are remote controls with automated audio and video selection control and associated methods. In an implementation, a remote control includes a microcontroller, an infrared remote library provisioned on the microcontroller, wherein the microcontroller and infrared remote library are programmed with control codes for at least one content device, at least one switch connected to the microcontroller, each switch associated with a selection function on the content device and each switch associated with at least one control code, an infrared light emitter connected to the microcontroller, an indicator device connected to the microcontroller, and a delay knob connected to the microcontroller, where the microcontroller and the infrared remote library are configured to, upon selection of a switch position at the at least one switch, control the infrared light emitter to emit repetitive infrared control codes at the content device at a repetition rate responsive to at least a reaction time for switching the selection function at the content device, the repetitive infrared control codes automatically incrementing or decrementing the selection function at the content device, where the delay knob is configured to set the repetition rate, and where the indicator device is configured to indicate emissions from the infrared light emitter.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
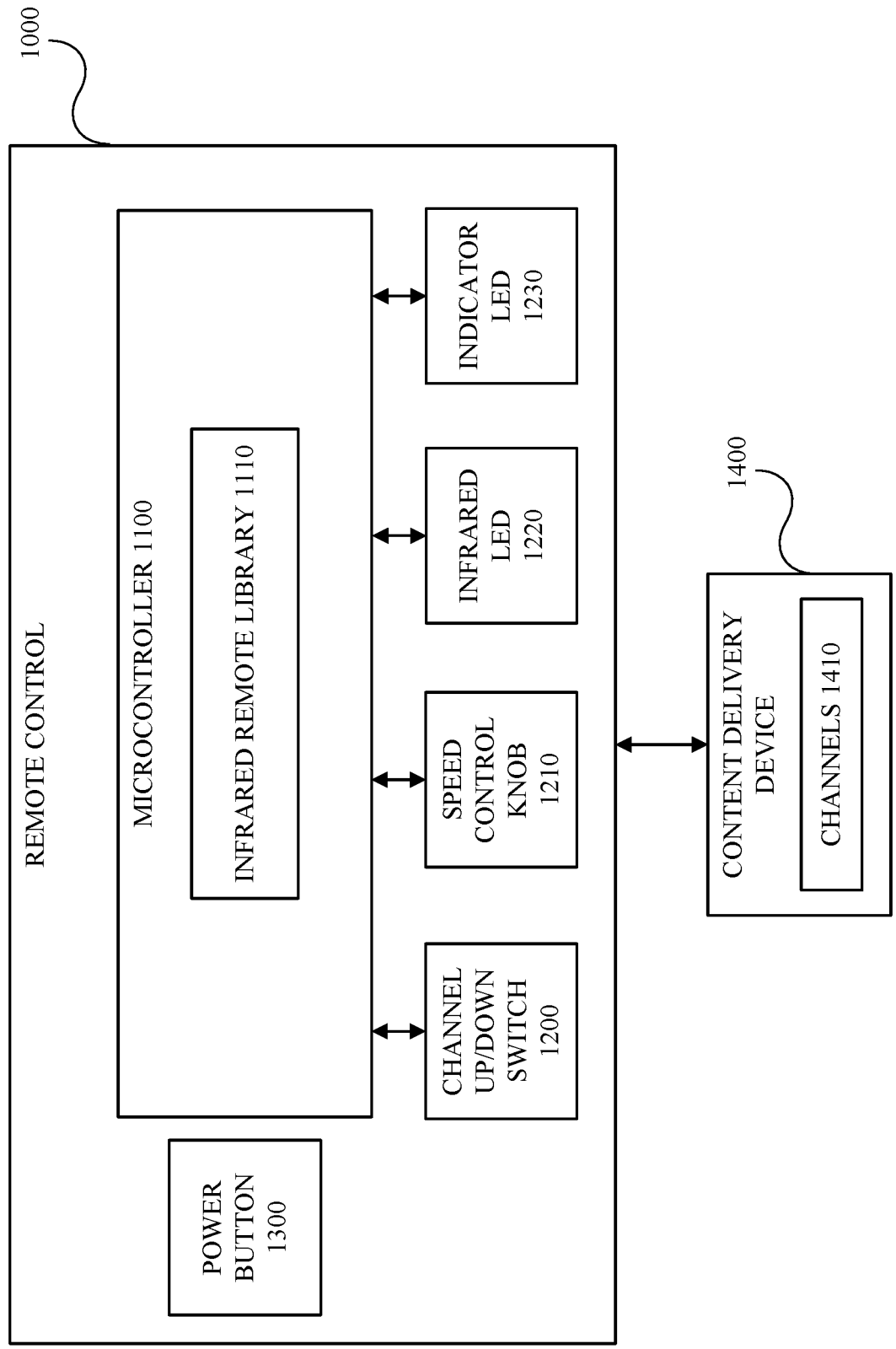
FIG. 1 is a block diagram of an example of a remote control in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, streaming, Internet Protocol (IP) video, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are remote controls with automated audio and video selection control and associated methods. In an implementation, a remote control includes a microcontroller which controls encoding and transmitting by an infrared (IR) light emitting diode (LED) (IR LED) of an up channel command or a down channel command (collectively "channel commands") to a content device such as a set top box, a television, a smart monitor, a gateway, streaming device, a distribution device, and the like on a repetitive basis to test all channels. The microcontroller includes an IR library which can be programmed with the content device codes, control codes, channel codes, or channel command codes (collectively "control codes") for the content device. An automated up/down channel switch controls whether up channel commands or down channel commands are sent. A speed control knob controls a wait time or repetition rate between the channel commands as different content devices have different reaction times to the channel commands. Moreover, the speed control knob allows control of how long to stay on a channel independent of the wait transmission time. The remote control reduces the possible repetitive stress injuries of pressing the normal remote control buttons hundreds of times while checking channels. Moreover, the remote control can decrease the amount of time needed to check all the channels. Although the description herein is with respect to IR-based control codes, other frequencies or wavelengths can be used as appropriate and applicable without departing from the scope of the specification, claims, or drawings.

In an implementation, a remote control includes an IR receiver to automatically program the control codes in the microcontroller and the IR library. The IR receiver can receive IR transmissions from a content device remote control and use the captured control codes to program the microcontroller and the IR library to encode IR transmissions from the remote control. Service provider personnel can then easily and quickly program the remote control when, for example, different subscribers have different content devices each with different control codes. In this implementations, the remote control includes a learn or program (collectively "learn") mode and a run mode. In the learn mode, the IR receiver can capture the control codes from the content device remote controls and program accordingly. This prevents the remote control from being reprogrammed each time a control code is sent when in the run mode.

In an implementation, the microcontroller and the IR library can encode IR transmissions which increase or decrease audio levels, i.e., volume control. A remote control includes an audio up or down switch to control whether increase or decrease volume commands are sent on a repetitive basis. The relevant control codes can be determined using an IR receiver, which can then be used to program the microcontroller and the IR library. As before, this reduces the possible repetitive stress injuries and decreases the testing time.

In an implementation, a remote control can include a manual channel up or down button and a manual volume up or down button in the event of an issue. This alleviates the need for the service provider personnel to switch between the remote control and a content device remote control. This can increase testing efficiencies.

In an implementation, the microcontroller and the IR library can encode IR transmissions which control other content selection functions, such as but not limited to, application selection, channel guide scrolling, content scrolling, and the like. The relevant control codes can be determined using an IR receiver, which can then be used to program the microcontroller and the IR library. This reduces the possible repetitive stress injuries and decreases the testing time by automatically cycling through the appropriate channels, scrolling, volume levels, and the like. In the event of testing at a subscriber, the remote control with automated selection enables checking audio and video content on each channel and enables checking remote control response functionality.

FIG. 1 is a diagram of an example remote control 1000 with automated selection control in accordance with embodiments of this disclosure. In an implementation, the remote control 1000 can include a microcontroller 1100 and an IR remote library 1110 provided on the microcontroller 1100. The microcontroller 1100 is connected to or in communication with (collectively "connected to") a channel up/down switch 1200, a speed control knob 1210, an IR LED 1220, and an indicator LED 1230. The remote control 1000 has a power button 1300 to turn on and off the remote control 1000. The remote control 1000 is configured to transmit IR controls, control codes, or channel commands (collectively "IR control codes") at a content device 1400 to control functionality such as controlling selection of channels 1410. In an implementation, the remote control 1000 may execute the techniques described in FIG. 7. The remote control 1000 is illustrative and may include additional, fewer or different buttons, switches, and the like which may be similarly or differently architected without departing from the scope of the specification and claims herein. Moreover, the illustrated devices may perform other functions without departing from the scope of the specification and claims herein.

The remote control 1000 can be any device which can repetitively or automatically control selection functionality of the content device 1400. In implementations, the selection functionality is channel selection.

The microcontroller 1100 can include central processing unit(s) (CPUs), core(s), memory, and programmable input/output (I/O) peripherals which can be used to repetitively control selection functionality of the content device 1400. The microcontroller 1100 is configured to use the inputs from the channel up/down switch 1200 and the speed control knob 1210 and call the IR remote library 1110 to collectively encode and control repetitive transmissions from the IR LED 1220 toward the content device 1400.

The IR remote library 1110 exposes an application programming interface (API) which enables the microcontroller 1100 and the remote control 1000 to control the content device 1400 using IR control code transmissions. The IR remote library 1110 has settings based on programmed control codes which determine the encoding to be used for different channels.

The channel up/down switch 1200 can be any component type which includes switch positions corresponding to an up channel command or a down channel command, i.e. controlling channels 1410. In implementations, the channel up/down switch 1200 can include a neutral position to enable staying or pausing at a channel. For example, in the case of an issue. In an implementation, the channel up/down switch 1200 can be a toggle switch, a slide switch, a rocker switch, and the like.

The speed control knob 1210 can be any component type which enables setting a wait time, a stay time, a delay time, or a repetition rate responsive to a reaction time of the content device 1400. In implementations, the wait time can be greater than the reaction time to permit longer stay or stopover times at each channel. In an implementation, the speed control knob 1210 can be a potentiometer. In an implementation, the speed control knob 1210 can be a rotary knob.

The IR LED 1220 is any type of IR emitter which transmits in the IR range of the electromagnetic radiation spectrum. For example, the IR range can be 700 nanometers (nms) to 1 (millimeter) mm range. The IR emissions are controlled by the IR remote library 1110 and the microcontroller 1100.

The indicator LED 1230 is any type of emitter which transmits at a spectrum, wavelength, or frequency (collectively "spectrum") perceivable by testing personnel. In implementations, the spectrum is in the visible spectrum, which can be in the range of 380 to 740 nms. The indicator LED 1230 can be tied to emissions from the IR LED 1220 so that the testing personnel is aware that the IR LED 1220 is presumably transmitting. In implementations, an audio indicator can be used.

The content device 1400 can be, but is not limited to, set top boxes (STBs), televisions, smart televisions, monitors, displays, entertainment devices, streaming devices, and the like. The content device 1400 can include a variety of selection control functionality including, but not limited to, channel selection 1410, volume control, application selection, guide scrolling, content scrolling, and the like.

Operationally, testing personnel turn on the remote control 1000 using power button 2300, where the remote control 1000 has the microcontroller 1100 and the IR remote library 1110 programmed with control codes associated with the content device 1400. The testing personnel sets the channel up/down switch 1200 to initiate repetitive IR control code transmissions to the content device 1400 to test each channel that is provided by a service provider. The IR control code transmissions are encoded using the programmed control codes. Based on the reaction time of the content device 1400, the testing personnel can adjust the transmission repetition times using the speed control knob 1210. Emissions from the IR LED 1220 can be tracked by the emissions on the indicator LED 1230.

Figure 2:
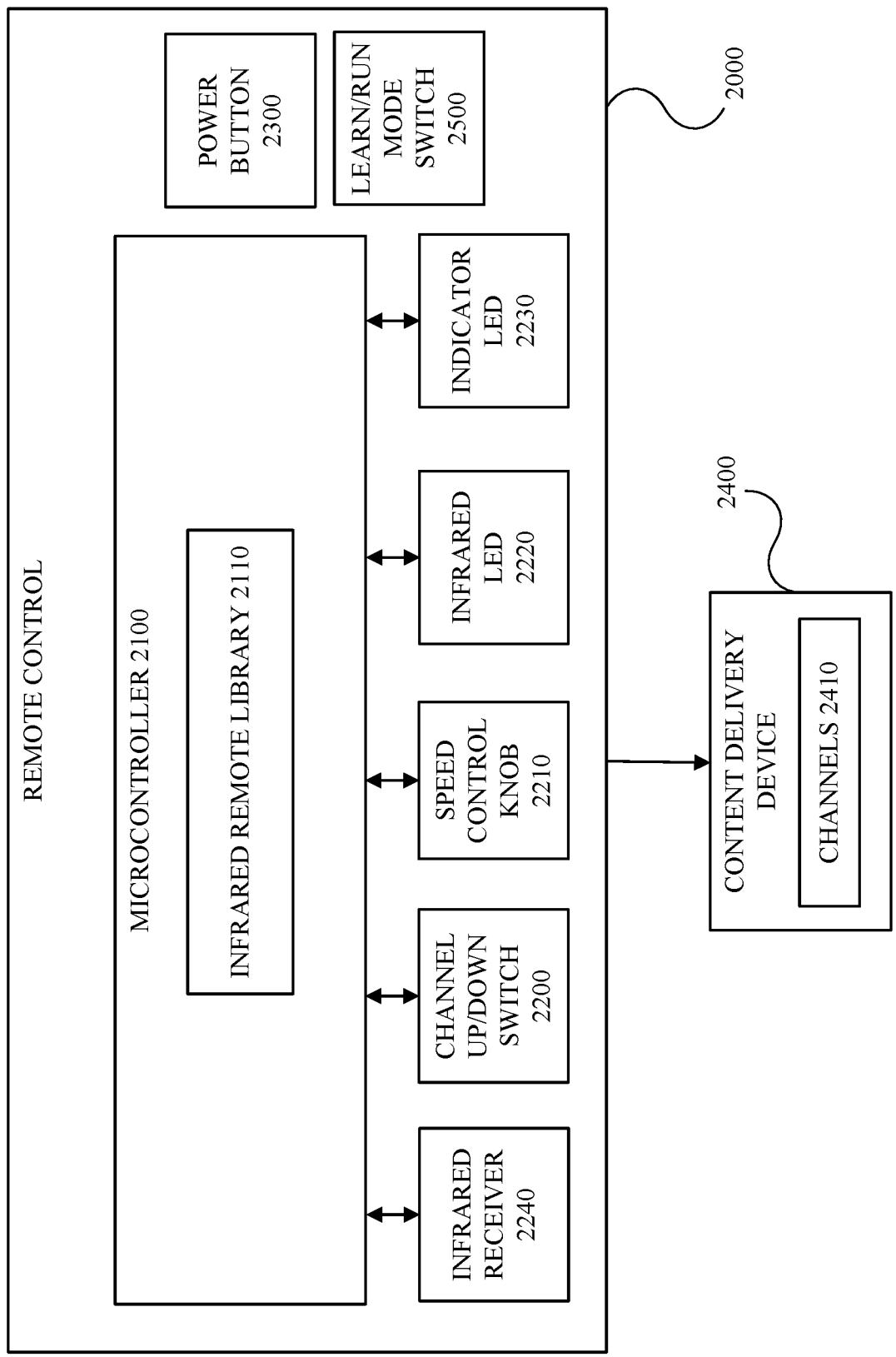
FIG. 2 is a block diagram of an example of a remote control in accordance with embodiments of this disclosure.

FIG. 2 is a diagram of an example remote control 2000 with automated selection control in accordance with embodiments of this disclosure. In an implementation, the remote control 2000 can include a microcontroller 2100 and an IR remote library 2110 provided on the microcontroller 2100. The microcontroller 2100 is connected to a channel up/down switch 2200, a speed control knob 2210, an IR LED 2220, an indicator LED 2230, and an IR receiver 2240. The remote control 2000 has a power button 2300 to turn on and off the remote control 2000. The remote control 2000 has a learn/run mode switch 2500 to automatically program the remote control 2000. The remote control 2000 is configured to transmit IR control code commands at a content device 2400 to control functionality such as controlling selection of channels 2410. In an implementation, the remote control 2000 may execute the techniques described in FIG. 7. The remote control 2000 is illustrative and may include additional, fewer or different buttons, switches, and the like which may be similarly or differently architected without departing from the scope of the specification and claims herein. Moreover, the illustrated devices may perform other functions without departing from the scope of the specification and claims herein.

The remote control 2000 can be any device which can repetitively or automatically control selection functionality of the content device 2400. In implementations, the selection functionality is channel selection.

The microcontroller 2100 can include central processing unit(s) (CPUs), core(s), memory, and programmable input/output (I/O) peripherals which can be used to repetitively control selection functionality of the content device 2400. The microcontroller 2100 is configured to use the control codes captured by the IR receiver 2240 to program the microcontroller 2100 and the IR remote library 2110. The microcontroller 2100 is configured to use the inputs from the channel up/down switch 2200, the speed control knob 2210, and call the IR remote library 2110 to collectively encode and control repetitive transmissions from the IR LED 2220 toward the content device 1400.

The IR remote library 2110 exposes an application programming interface (API) which enables the microcontroller 2100 and the remote control 2000 to control the content device 2400 using IR control code transmissions. The IR remote library 2110 has settings based on programmed control codes, as provided by IR receiver 2240, which determine the encoding to be used for different channels.

The channel up/down switch 2200 can be any component type which includes switch positions corresponding to an up channel command or a down channel command, i.e. controlling channels 2410. In implementations, the channel up/down switch 2200 can include a neutral position to enable staying or pausing at a channel. For example, in the case of an issue. In an implementation, the channel up/down switch 2200 can be a toggle switch, a slide switch, a rocker switch, and the like.

The speed control knob 2210 can be any component type which enables setting a wait or delay time responsive to a reaction time of the content device 2400. In implementations, the wait time can be greater than the reaction time to permit longer stay or stopover times at each channel. In an implementation, the speed control knob 2210 can be a potentiometer. In an implementation, the speed control knob 2210 can be a rotary knob.

The IR LED 2220 is any type of IR emitter which transmits in the IR range of the electromagnetic radiation spectrum. For example, the IR range can be 700 nanometers (nms) to 1 (millimeter) mm range. The IR emissions are controlled by the IR remote library 2110 and the microcontroller 2100.

The indicator LED 2230 is any type of emitter which transmits at a spectrum, wavelength, or frequency (collectively "spectrum") perceivable by testing personnel. In implementations, the spectrum is in the visible spectrum, which can be in the range of 380 to 740 nms. The indicator LED 2230 can be tied to emissions from the IR LED 2220 so that the testing personnel is aware that the IR LED 2220 is presumably transmitting. In implementations, an audio indicator can be used.

The IR receiver 2240 is any type of device which can capture IR transmissions from a content device remote which have the control codes for that content device. The control codes are programmed into the microcontroller 2100 and the IR remote library 2110 for later IR transmissions via the IR LED 2220. In implementations with the IR receiver 2240, the remote control 2000 includes a learn mode and run mode switch 2500. In the learn mode, the IR receiver 2240 can capture the control codes from the content device remote controls and program accordingly. This prevents the remote control 2000 from being reprogrammed each time a control code is sent when in the run mode.

The content device 2400 can be, but is not limited to, set top boxes (STBs), televisions, smart televisions, monitors, displays, entertainment devices, streaming devices, and the like. The content device 2400 can include a variety of selection control functionality including, but not limited to, channel selection 2410, volume control, application selection, guide scrolling, content scrolling, and the like.

Operationally, testing personnel turn on the remote control 2000 using power button 2300. In the event the remote control 2000 is not programmed with the control codes of the content device 2400, the IR receiver 2240 is used to capture the control codes from a remote control associated with the content device 2400 and automatically program the microcontroller 2100 and the IR remote library 2110 in the learn mode. The testing personnel sets the channel up/down switch 2200 to initiate repetitive IR control code transmissions to the content device 2400 to test each channel that is provided by a service provider in the run mode. The IR control code transmissions are encoded using the programmed control codes. Based on the reaction time of the content device 2400, the testing personnel can adjust the transmission repetition times using the speed control knob 2210. Emissions from the IR LED 2220 can be tracked by the emissions on the indicator LED 2230.

Figure 3:
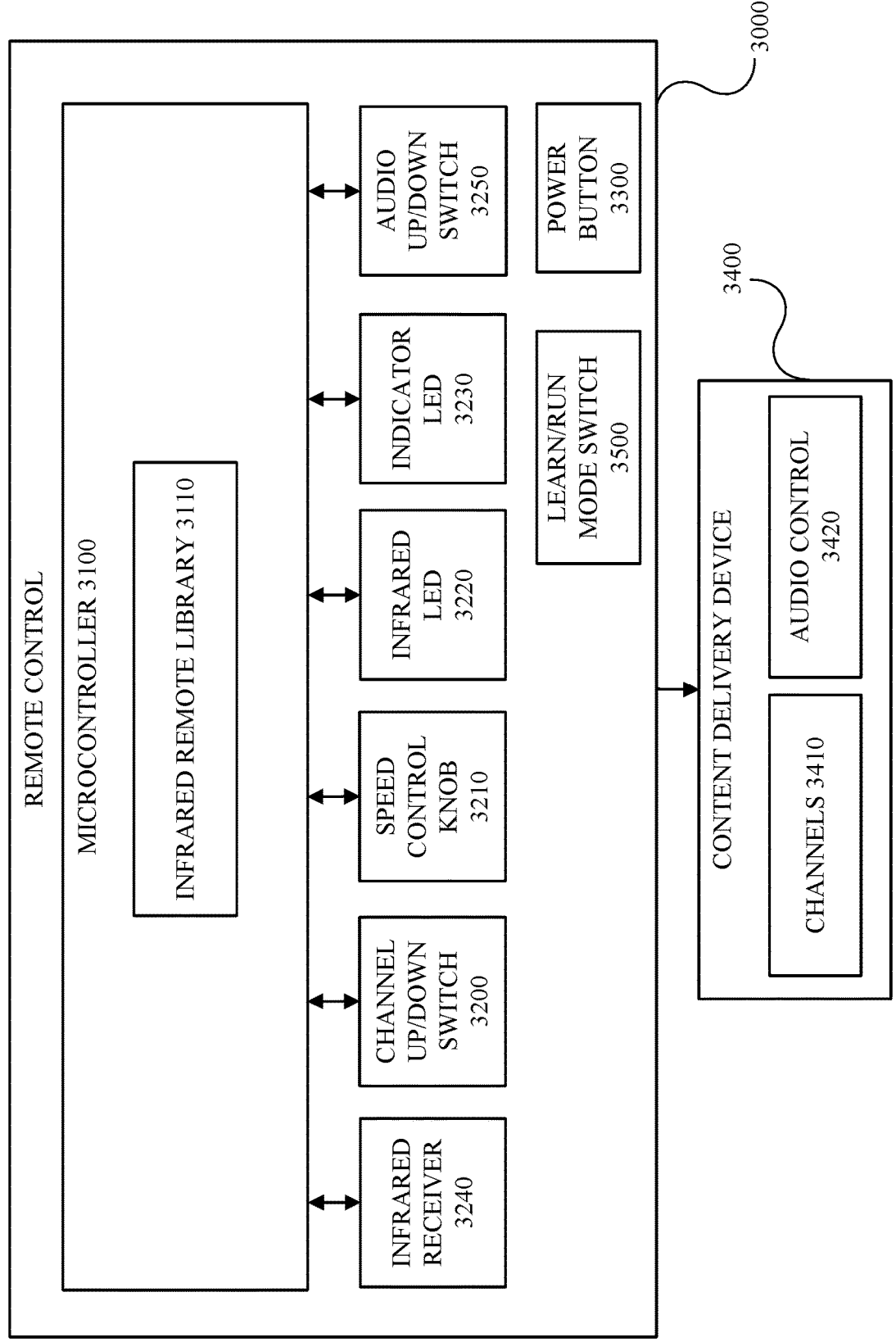
FIG. 3 is a block diagram of an example of a remote control in accordance with embodiments of this disclosure.

FIG. 3 is a diagram of an example remote control 3000 with automated selection control in accordance with embodiments of this disclosure. In an implementation, the remote control 3000 can include a microcontroller 3100 and an IR remote library 3110 provided on the microcontroller 3100. The microcontroller 3100 is connected to a channel up/down switch 3200, a speed control knob 3210, an IR LED 3220, an indicator LED 3230, an IR receiver 3240, and an audio up/down switch 3250. The remote control 3000 has a power button 3300 to turn on and off the remote control 3000. The remote control 3000 has a learn/run mode switch 3500 to automatically program the remote control 3000. The remote control 3000 is configured to transmit IR control code commands at a content device 3400 to control functionality such as controlling selection of channels 3410 and controlling audio or volume control 3420. In an implementation, the remote control 3000 may execute the techniques described in FIG. 7. The remote control 3000 is illustrative and may include additional, fewer or different buttons, switches, and the like which may be similarly or differently architected without departing from the scope of the specification and claims herein. Moreover, the illustrated devices may perform other functions without departing from the scope of the specification and claims herein.

The remote control 3000 can be any device which can repetitively or automatically control selection functionality of the content device 3400. In implementations, the selection functionality is channel selection, audio control, and the like.

The microcontroller 3100 can include central processing unit(s) (CPUs), core(s), memory, and programmable input/output (I/O) peripherals which can be used to repetitively control selection functionality of the content device 3400. The microcontroller 3100 is configured to use the control codes captured by the IR receiver 3240 to program the microcontroller 3100 and the IR remote library 3110. The microcontroller 3100 is configured to use the inputs from the channel up/down switch 3200, the speed control knob 3210, the audio up/down switch 3250, and call the IR remote library 3110 to collectively encode and control repetitive transmissions from the IR LED 3220 toward the content device 3400.

The IR remote library 3110 exposes an application programming interface (API) which enables the microcontroller 3100 and the remote control 3000 to control the content device 3400 using IR control code transmissions. The IR remote library 3110 has settings based on programmed control codes, as provided by IR receiver 3240, which determine the encoding to be used for different channels.

The channel up/down switch 3200 can be any component type which includes switch positions corresponding to an up channel command or a down channel command, i.e. controlling channels 3410. In implementations, the channel up/down switch 3200 can include a neutral position to enable staying or pausing at a channel. For example, in the case of an issue. In an implementation, the channel up/down switch 3200 can be a toggle switch, a slide switch, a rocker switch, and the like.

The speed control knob 3210 can be any component type which enables setting a wait or delay time responsive to a reaction time of the content device 3400. In implementations, the wait time can be greater than the reaction time to permit longer stay or stopover times at each channel. In an implementation, the speed control knob 3210 can be a potentiometer. In an implementation, the speed control knob 3210 can be a rotary knob.

The IR LED 3220 is any type of IR emitter which transmits in the IR range of the electromagnetic radiation spectrum. For example, the IR range can be 700 nanometers (nms) to 1 (millimeter) mm range. The IR emissions are controlled by the IR remote library 3110 and the microcontroller 3100.

The indicator LED 3230 is any type of emitter which transmits at a spectrum, wavelength, or frequency (collectively "spectrum") perceivable by testing personnel. In implementations, the spectrum is in the visible spectrum, which can be in the range of 380 to 740 nms. The indicator LED 3230 can be tied to emissions from the IR LED 3220 so that the testing personnel is aware that the IR LED 3220 is presumably transmitting. In implementations, an audio indicator can be used.

The IR receiver 3240 is any type of device which can capture IR transmissions from a content device remote which have the control codes for that content device. The control codes are programmed into the microcontroller 3100 and the IR remote library 3110 for later IR transmissions via the IR LED 3220. In implementations with the IR receiver 3240, the remote control 3000 includes a learn mode and run mode switch 3500. In the learn mode, the IR receiver 3240 can capture the control codes from the content device remote controls and program accordingly. This prevents the remote control 3000 from being reprogrammed each time a control code is sent when in the run mode.

The audio up/down switch 3250 can be any component type which can increase or decrease audio at the content device 3400, i.e., the audio control 3420. In implementations, the audio up/down switch 3250 a slide switch, a rocker switch, a rotary knob, and the like.

The content device 3400 can be, but is not limited to, set top boxes (STBs), televisions, smart televisions, monitors, displays, entertainment devices, streaming devices, and the like. The content device 3400 can include a variety of selection control functionality including, but not limited to, channel selection 3410, audio control 3420, application selection, guide scrolling, content scrolling, and the like. In implementations, the audio up/down switch 3250 can be controlled to initiate control codes during the stay time at each channel. Both video and audio can be tested at the same time in this implementation.

Operationally, testing personnel turn on the remote control 3000 using power button 3300. In the event the remote control 3000 is not programmed with the control codes of the content device 3400, the IR receiver 3240 is used to capture the control codes from a remote control associated with the content device 3400 and automatically program the microcontroller 3100 and the IR remote library 3110 in the learn mode. The testing personnel sets the channel up/down switch 3200 to initiate repetitive IR control code transmissions to the content device 3400 to test each channel that is provided by a service provider in the run mode. For a given channel, the testing personnel can set the audio up/down switch 3250 to initiate repetitive IR control code transmissions to the content device 3400 to test the audio on each channel that is provided by a service provider. The IR control code transmissions are encoded using the programmed control codes. The testing personnel can adjust the transmission repetition times using the speed control knob 3210 based on the reaction time of the content device 3400, the amount of stay time needed at each channel to test video and audio, or combinations thereof. Emissions from the IR LED 3220 can be tracked by the emissions on the indicator LED 3230.

Figure 4:
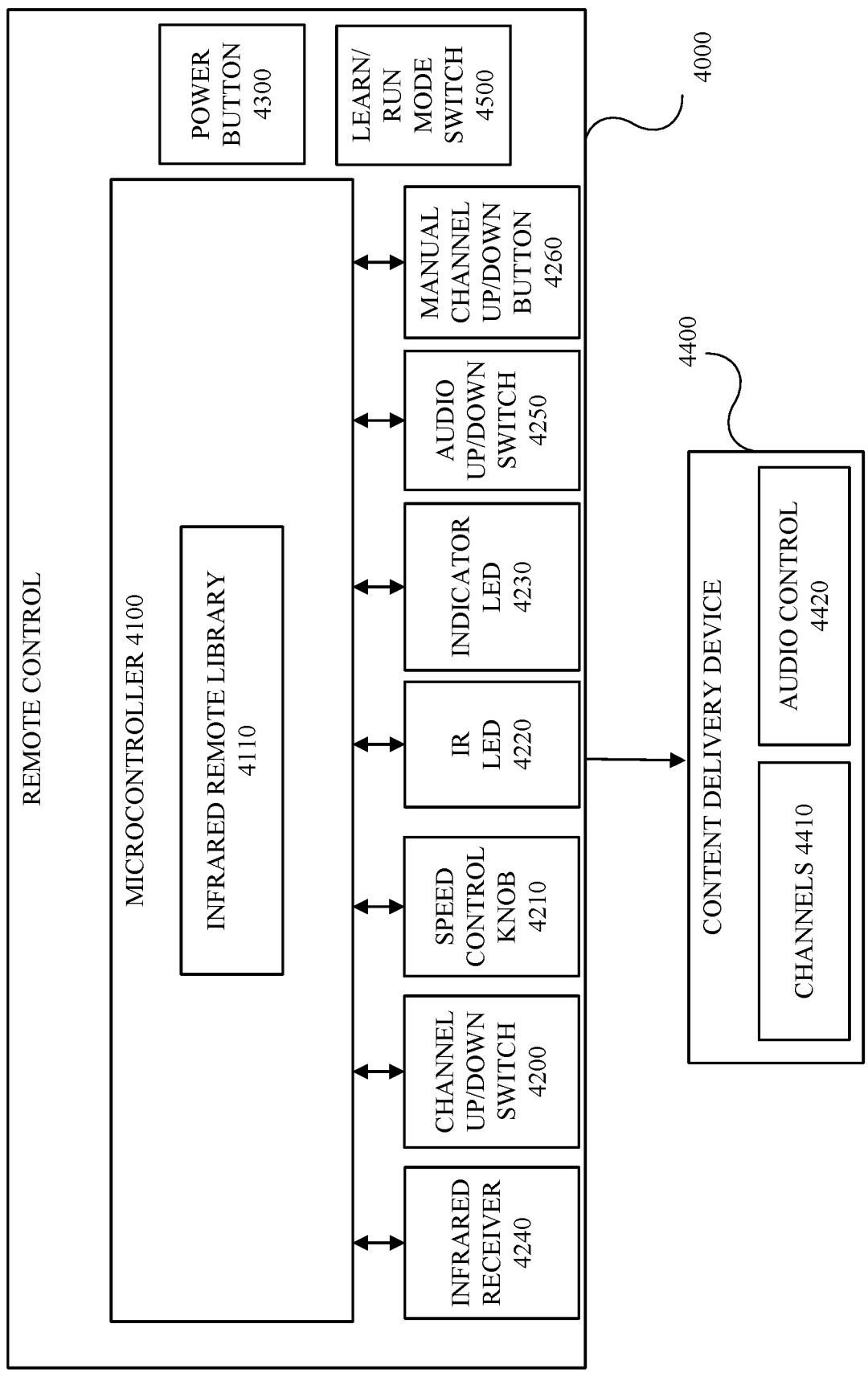
FIG. 4 is a block diagram of an example of an example remote control in accordance with embodiments of this disclosure.

FIG. 4 is a diagram of an example remote control 4000 with automated selection control in accordance with embodiments of this disclosure. In an implementation, the remote control 4000 can include a microcontroller 4100 and an IR remote library 4110 provided on the microcontroller 4100. The microcontroller 4100 is connected to a channel up/down switch 4200, a speed control knob 4210, an IR LED 4220, an indicator LED 4230, an IR receiver 4240, an audio up/down switch 4250, and a manual channel up/down switch 4260. The remote control 4000 has a power button 4300 to turn on and off the remote control 4000. The remote control 4000 has a learn/run mode switch 4500 to automatically program the remote control 4000. The remote control 4000 is configured to transmit IR control codes at a content device 4400 to control functionality such as controlling selection of channels 4410 and controlling audio or volume control 4420. In an implementation, the remote control 4000 may execute the techniques described in FIG. 7. The remote control 4000 is illustrative and may include additional, fewer or different buttons, switches, and the like which may be similarly or differently architected without departing from the scope of the specification and claims herein. Moreover, the illustrated devices may perform other functions without departing from the scope of the specification and claims herein.

The remote control 4000 can be any device which can repetitively or automatically control selection functionality of the content device 4400. In implementations, the selection functionality is channel selection, audio control, and the like.

The microcontroller 4100 can include central processing unit(s) (CPUs), core(s), memory, and programmable input/output (I/O) peripherals which can be used to repetitively control selection functionality of the content device 4400. The microcontroller 4100 is configured to use the control codes captured by the IR receiver 4240 to program the microcontroller 3100 and the IR remote library 4110. The microcontroller 4100 is configured to use the inputs from the channel up/down switch 4200, the speed control knob 4210, the audio up/down switch 4250, manual channel up/down switch 4260, and call the IR remote library 4110 to collectively encode and control repetitive or manual transmissions from the IR LED 4220 toward the content device 4400.

The IR remote library 4110 exposes an application programming interface (API) which enables the microcontroller 4100 and the remote control 4000 to control the content device 4400 using IR control code transmissions. The IR remote library 4110 has settings based on programmed control codes, as provided by IR receiver 4240, which determine the encoding to be used for different channels.

The channel up/down switch 4200 can be any component type which includes switch positions corresponding to an up channel command or a down channel command, i.e. controlling channels 4410. In implementations, the channel up/down switch 4200 can include a neutral position to enable staying or pausing at a channel. For example, in the case of an issue. In an implementation, the channel up/down switch 4200 can be a toggle switch, a slide switch, a rocker switch, and the like.

The speed control knob 4210 can be any component type which enables setting a wait or delay time responsive to a reaction time of the content device 4400. In implementations, the wait time can be greater than the reaction time to permit longer stay or stopover times at each channel. In an implementation, the speed control knob 4210 can be a potentiometer. In an implementation, the speed control knob 4210 can be a rotary knob.

The IR LED 4220 is any type of IR emitter which transmits in the IR range of the electromagnetic radiation spectrum. For example, the IR range can be 700 nanometers (nms) to 1 (millimeter) mm range. The IR emissions are controlled by the IR remote library 4110 and the microcontroller 4100.

The indicator LED 4230 is any type of emitter which transmits at a spectrum, wavelength, or frequency (collectively "spectrum") perceivable by testing personnel. In implementations, the spectrum is in the visible spectrum, which can be in the range of 380 to 740 nms. The indicator LED 4230 can be tied to emissions from the IR LED 4220 so that the testing personnel is aware that the IR LED 4220 is presumably transmitting. In implementations, an audio indicator can be used.

The IR receiver 4240 is any type of device which can capture IR transmissions from a content device remote which have the control codes for that content device. The control codes are programmed into the microcontroller 4100 and the IR remote library 4110 for later IR transmissions via the IR LED 4220. In implementations with the IR receiver 4240, the remote control 4000 includes a learn mode and run mode switch 4500. In the learn mode, the IR receiver 4240 can capture the control codes from the content device remote controls and program accordingly. This prevents the remote control 4000 from being reprogrammed each time a control code is sent when in the run mode.

The audio up/down switch 4250 can be any component type which can increase or decrease audio at the content device 4400, i.e., the audio control 4420. In implementations, the audio up/down switch 4250 a slide switch, a rocker switch, a rotary knob, and the like.

The manual channel up/down switch 4260 can be any component type which includes switch positions corresponding to an up channel command or a down channel command, i.e. controlling channels 4410. In an implementation, the manual channel up/down switch 4260 can be a toggle switch, a slide switch, a rocker switch, and the like. The manual channel up/down switch 4260 can be used to individually move from one channel to another channel in the event of an issue.

The content device 4400 can be, but is not limited to, set top boxes (STBs), televisions, smart televisions, monitors, displays, entertainment devices, streaming devices, and the like. The content device 4400 can include a variety of selection control functionality including, but not limited to, channel selection 4410, audio control 4420, application selection, guide scrolling, content scrolling, and the like.

Operationally, testing personnel turn on the remote control 4000 using power button 4300. In the event the remote control 4000 is not programmed with the control codes of the content device 4400, the IR receiver 4240 is used to capture the control codes from a remote control associated with the content device 4400 and automatically program the microcontroller 4100 and the IR remote library 4110 in the learn mode. The testing personnel sets the channel up/down switch 4200 to initiate repetitive IR control code transmissions to the content device 4400 to test each channel that is provided by a service provider in the run mode. If the testing personnel notices an issue with a channel, the manual channel up/down switch 4260 can be used to switch to the problematic channel. For a given channel, either in repetitive mode using the channel up/down switch 4200 or in manual mode using the manual channel up/down switch 4260, the testing personnel can set the audio up/down switch 4250 to initiate repetitive IR control code transmissions to the content device 4400 to test the audio on each channel that is provided by a service provider. The IR control code transmissions are encoded using the programmed control codes. The testing personnel can adjust the transmission repetition times using the speed control knob 4210 based on the reaction time of the content device 4400, the amount of stay time needed at each channel to test video and audio, or combinations thereof. Emissions from the IR LED 4220 can be tracked by the emissions on the indicator LED 4230.

Figure 5:
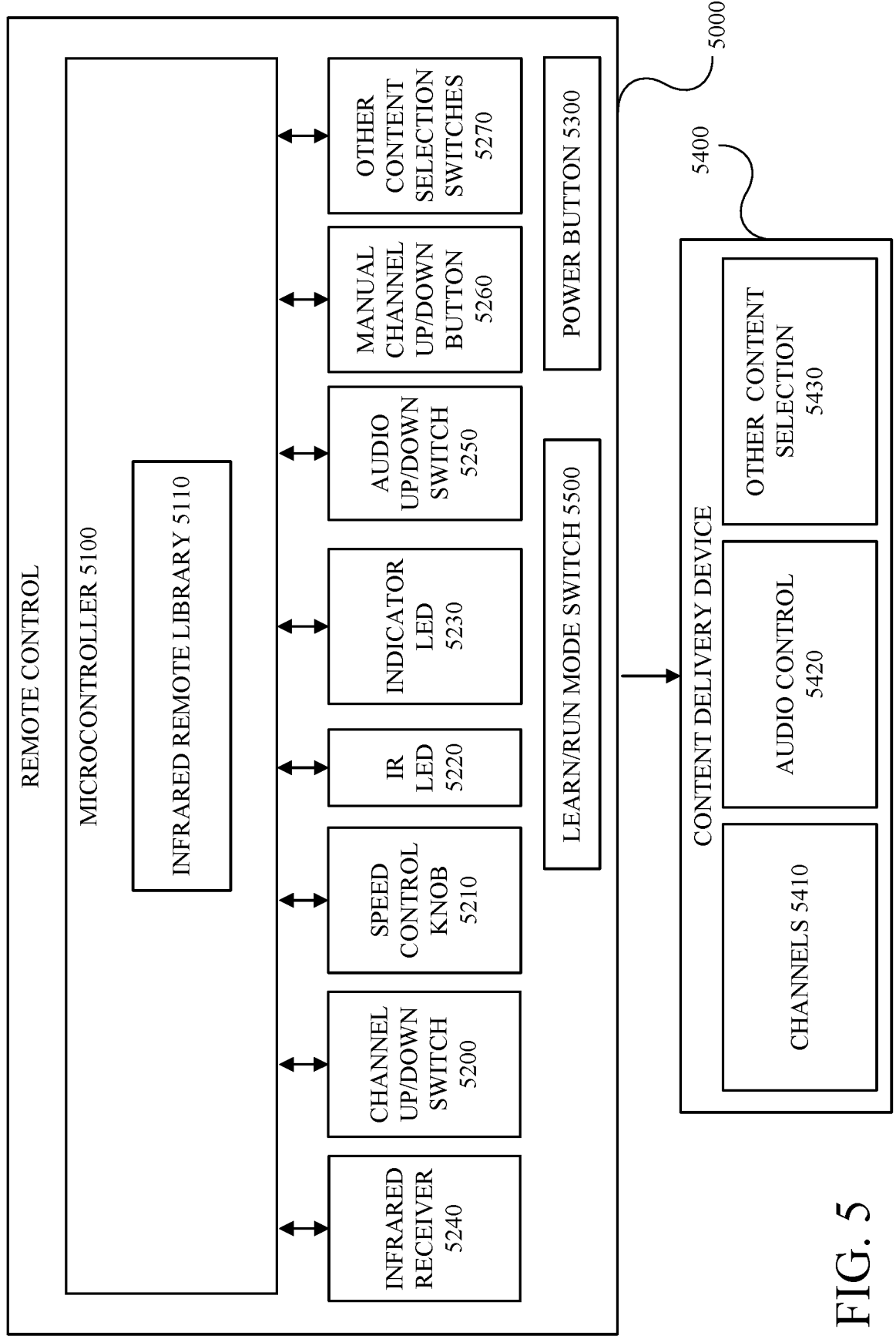
FIG. 5 is a block diagram of an example of a remote control in accordance with embodiments of this disclosure.

FIG. 5 is a diagram of an example remote control 5000 with automated selection control in accordance with embodiments of this disclosure. In an implementation, the remote control 5000 can include a microcontroller 5100 and an IR remote library 5110 provided on the microcontroller 5100. The microcontroller 5100 is connected to a channel up/down switch 5200, a speed control knob 5210, an IR LED 5220, an indicator LED 5230, an IR receiver 5240, an audio up/down switch 5250, a manual channel up/down switch 5260, and other content selection switches 5270. The remote control 5000 has a power button 5300 to turn on and off the remote control 5000. The remote control 5000 has a learn/run mode switch 5500 to automatically program the remote control 5000. The remote control 5000 is configured to transmit IR control code commands at a content device 5400 to control functionality such as controlling selection of channels 5410, controlling audio or volume control 5420, and controlling other content selection 5430. In an implementation, the remote control 5000 may execute the techniques described in FIG. 7. The remote control 5000 is illustrative and may include additional, fewer or different buttons, switches, and the like which may be similarly or differently architected without departing from the scope of the specification and claims herein. Moreover, the illustrated devices may perform other functions without departing from the scope of the specification and claims herein.

The remote control 5000 can be any device which can repetitively or automatically control selection of the content device 5400. In implementations, the selection is channel selection, audio control, other selection functionality, and the like.

The microcontroller 5100 can include central processing unit(s) (CPUs), core(s), memory, and programmable input/output (I/O) peripherals which can be used to repetitively control selection of the content device 5400. The microcontroller 5100 is configured to use the control codes captured by the IR receiver 5240 to program the microcontroller 5100 and the IR remote library 5110. The microcontroller 5100 is configured to use the inputs from the channel up/down switch 5200, the speed control knob 5210, the audio up/down switch 5250, manual channel up/down switch 5260, other content selection switches 5270, and call the IR remote library 5110 to collectively encode and control repetitive or manual transmissions from the IR LED 5220 toward the content device 5400.

The IR remote library 5110 exposes an application programming interface (API) which enables the microcontroller

5100 and the remote control 5000 to control the content device 5400 using IR control code transmissions. The IR remote library 5110 has settings based on programmed control codes, as provided by IR receiver 5240, which determine the encoding to be used for different channels.

The channel up/down switch 5200 can be any component type which includes switch positions corresponding to an up channel command or a down channel command, i.e. controlling channels 5410. In implementations, the channel up/down switch 5200 can include a neutral position to enable staying or pausing at a channel. For example, in the case of an issue. In an implementation, the channel up/down switch 5200 can be a toggle switch, a slide switch, a rocker switch, and the like.

The speed control knob 5210 can be any component type which enables setting a wait or delay time responsive to a reaction time of the content device 5400. In implementations, the wait time can be greater than the reaction time to permit longer stay or stopover times at each channel. In an implementation, the speed control knob 5210 can be a potentiometer. In an implementation, the speed control knob 5210 can be a rotary knob.

The IR LED 5220 is any type of IR emitter which transmits in the IR range of the electromagnetic radiation spectrum. For example, the IR range can be 700 nanometers (nms) to 1 (millimeter) mm range. The IR emissions are controlled by the IR remote library 5110 and the microcontroller 5100.

The indicator LED 5230 is any type of emitter which transmits at a spectrum, wavelength, or frequency (collectively "spectrum") perceivable by testing personnel. In implementations, the spectrum is in the visible spectrum, which can be in the range of 380 to 740 nms. The indicator LED 5230 can be tied to emissions from the IR LED 5220 so that the testing personnel is aware that the IR LED 5220 is presumably transmitting. In implementations, an audio indicator can be used.

The IR receiver 5240 is any type of device which can capture IR transmissions from a content device remote which have the control codes for that content device. The control codes are programmed into the microcontroller 5100 and the IR remote library 5110 for later IR transmissions via the IR LED 5220. In implementations with the IR receiver 5240, the remote control 5000 includes a learn mode and run mode switch 5500. In the learn mode, the IR receiver 5240 can capture the control codes from the content device remote controls and program accordingly. This prevents the remote control 5000 from being reprogrammed each time a control code is sent when in the run mode.

The audio up/down switch 5250 can be any component type which can increase or decrease audio at the content device 5400, i.e., the audio control 5420. In implementations, the audio up/down switch 5250 a slide switch, a rocker switch, a rotary knob, and the like.

The manual channel up/down switch 5260 can be any component type which includes switch positions corresponding to an up channel command or a down channel command, i.e. controlling channels 5410. In an implementation, the manual channel up/down switch 5260 can be a toggle switch, a slide switch, a rocker switch, and the like. The manual channel up/down switch 5260 can be used to individually move from one channel to another channel in the event of an issue.

The other content selection switches 5270 can be any component type which includes switch positions corresponding to a directional command, i.e. controlling other content selection functions 5430 such as, but not limited to, guide menu scrolling, content scrolling, application selection, and the like. In an implementation, the other content selection switches 5270 can be a toggle switch, a slide switch, a rocker switch, and the like.

The content device 5400 can be, but is not limited to, set top boxes (STBs), televisions, smart televisions, monitors, displays, entertainment devices, streaming devices, and the like. The content device 5400 can include a variety of selection functions including, but not limited to, channel selection 5410, audio control 5420, application selection, guide scrolling, content scrolling, and the like (collectively "other content selection functions 5430").

Operationally, testing personnel turn on the remote control 5000 using power button 5300. In the event the remote control 5000 is not programmed with the control codes of the content device 5400, the IR receiver 5240 is used to capture the control codes from a remote control associated with the content device 5400 and automatically program the microcontroller 5100 and the IR remote library 5110 in the learn mode. The testing personnel sets the channel up/down switch 5200 or the other remote control selection function switches 5270 to initiate repetitive IR control code transmissions to the content device 5400 to test each channel that is provided by a service provider in the run mode. If the testing personnel notices an issue with a channel, the manual channel up/down switch 5260 can be used to switch to the problematic channel. For a given channel, either in repetitive mode using the channel up/down switch 5200 or in manual mode using the manual channel up/down switch 5260, the testing personnel can set the audio up/down switch 5250 to initiate repetitive IR control code transmissions to the content device 5400 to test the audio on each channel that is provided by a service provider. The IR control code transmissions are encoded using the programmed control codes. The testing personnel can adjust the transmission repetition times using the speed control knob 5210 based on the reaction time of the content device 5400, the amount of stay time needed at each channel to test video and audio, or combinations thereof. Emissions from the IR LED 5220 can be tracked by the emissions on the indicator LED 5230.

Figure 6:
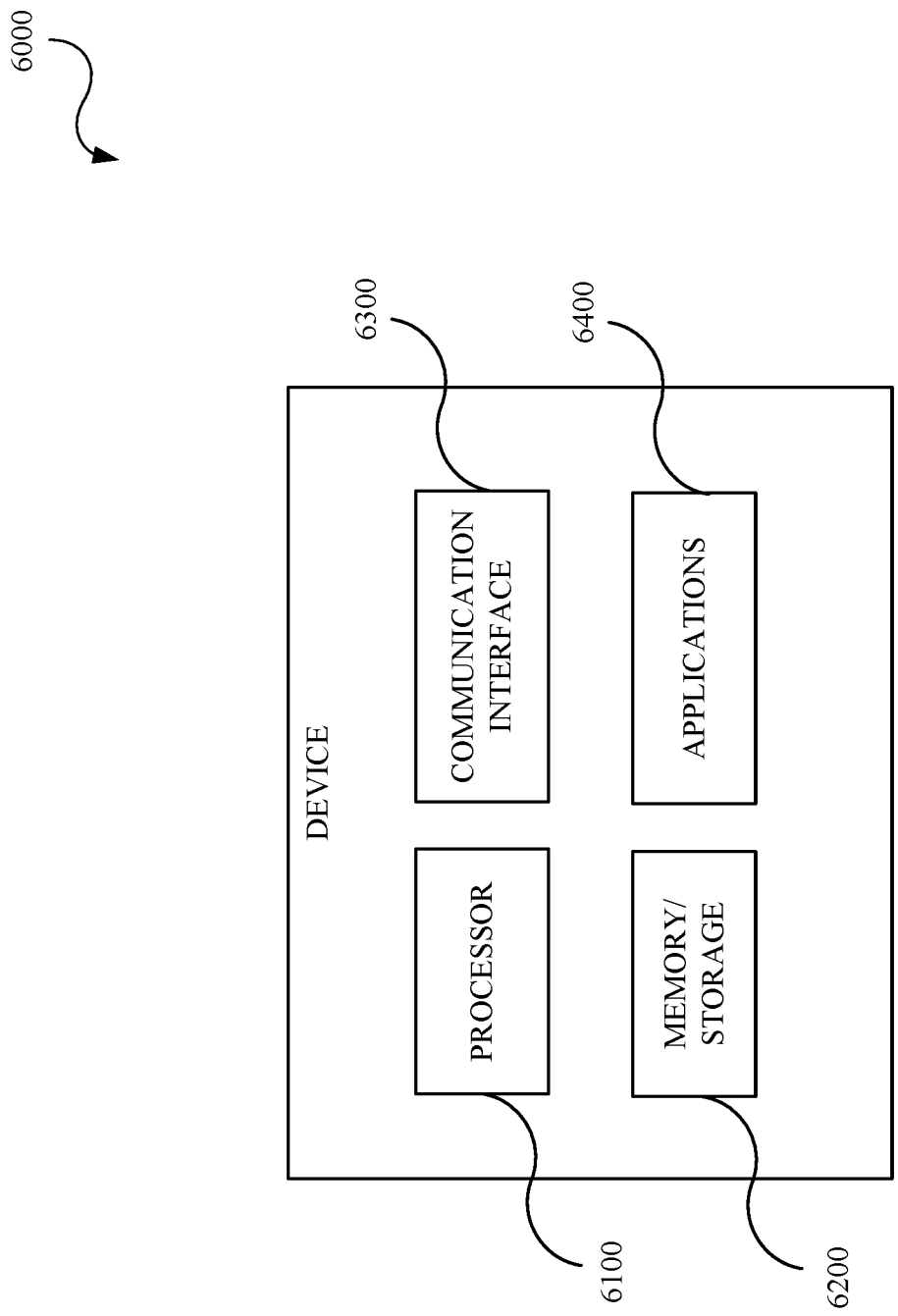
FIG. 6 is a block diagram of an example of a device in accordance with embodiments of this disclosure.

FIG. 6 is a block diagram of an example of a device 6000 in accordance with embodiments of this disclosure. The device 6000 may include, but is not limited to, a processor 6100, a memory/storage 6200, a communication interface 6300, and applications 6400. The device 6000 may include or implement, for example, the remote control 1000, the content device 1400, the remote control 2000, the content device 2400, the remote control 3000, the content device 3400, the remote control 4000, the content device 4400, the remote control 5000, and the content device 5400. In an implementation, the memory/storage 6200 may store the control codes and like information. The remote control with automated election control techniques or methods described herein may be stored in the memory/storage 6200 and executed by the processor 6100 in cooperation with the memory/storage 6200, the communications interface 6300, and applications 6400, as appropriate. The device 6000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 7:
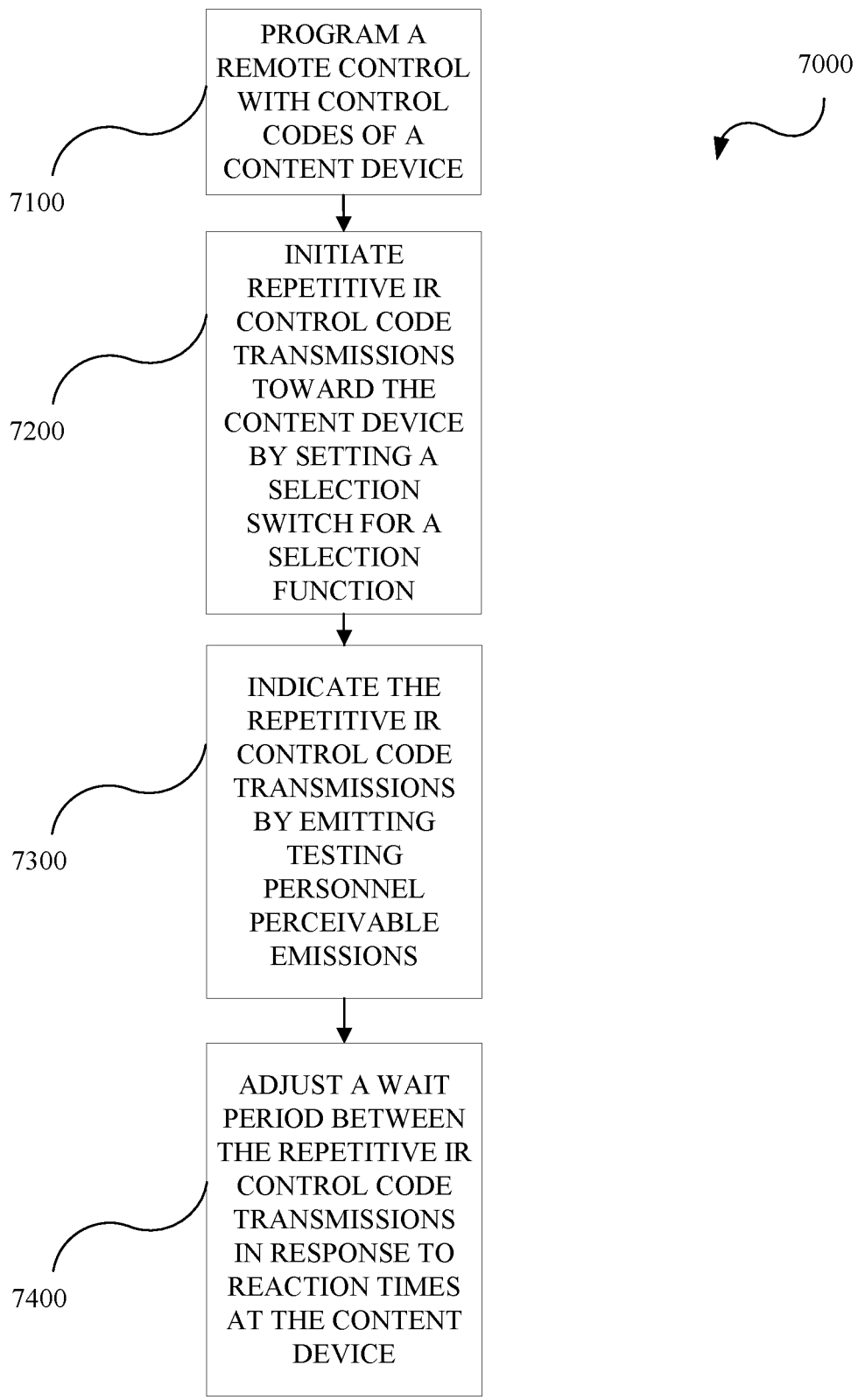
FIG. 7 is a flowchart of an example of a method for automated channel checking in accordance with embodiments of this disclosure.

FIG. 7 is a flowchart of an example method 7000 for automated selection via a remote control in accordance with embodiments of this disclosure. The method 7000 includes:

programming 7100 a remote control with control codes of a content device; initiating 7200 repetitive IR control code transmissions toward the content device by setting a selection switch for a selection function; indicating 7300 the repetitive IR control code transmissions by emitting testing personnel perceivable emissions; and adjusting 7400 a wait period between the repetitive IR control code transmissions in response to reaction times at the content device. For example, the method 7000 may be implemented, as applicable and appropriate, by the remote control 1000 of FIG. 1, the content device 1400 of FIG. 1, the remote control 2000 of FIG. 2, the content device 2400 of FIG. 2, the remote control 3000 of FIG. 3, the content device 3400 of FIG. 3, the remote control 4000 of FIG. 4, the content device 4400 of FIG. 4, the remote control 5000 of FIG. 5, the content device 5400 of FIG. 5, and device 6000 of FIG. 6.

The method 7000 includes programming 7100 a remote control with control codes of a content device. Content devices have control codes which are associated with changing channels on the content device, changing volume on the content device, scrolling using the guide on the content device, scrolling on a selected channel on the content device, and other selection functionality. In implementations, the remote control can be automatically programmed with the control codes using an IR receiver. The IR receiver captures control codes emissions from a content device remote control and programs a microcontroller and remote IR library accordingly. In implementations with the IR receiver, the remote control includes a learn mode and run mode switch. In the learn mode, the IR receiver can capture the control codes from the content device remote controls and program accordingly. This prevents the remote control from being reprogrammed each time a control code is sent when in the run mode.

The method 7000 includes initiating 7200 repetitive IR control code transmissions toward the content device by setting a selection switch for a selection function. Each channel has to be switched to and content observed or listened to confirm content viability in terms of reception, clarity, and other like factors. Automating the switching of the selection function improves efficiency and decreases chances of repetitive motion injury to testing personnel. A switch on the remote control is set in one of two directions to sequence through the available channels. Other switches can be used to increase or decrease volume during a stay time at a channel. In implementations, the volume switch can be automatically initiated during each stay time.

The method 7000 includes indicating 7300 the repetitive IR control code transmissions by emitting testing personnel perceivable emissions. Since IR emissions are not readily visible to testing personnel, other indicators are used to indicate the IR emissions. In implementations, emissions from a visible LED are emitted when IR emissions are emitted. In implementations, an audio indicator is used.

The method 7000 includes adjusting 7400 a wait period between the repetitive IR control code transmissions in response to reaction times at the content device. Content devices can react differently in the amount of time needed to switch channels, volume, and the like. The stay time at each channel can be adjusted to accommodate the reaction time and any additional time needed for other activities such as volume control.

In general, a remote control includes a microcontroller, an infrared remote library provisioned on the microcontroller, wherein the microcontroller and infrared remote library are programmed with control codes for at least one content device, at least one switch connected to the microcontroller, each switch associated with a selection function on the content device and each switch associated with at least one control code, an infrared light emitter connected to the microcontroller, an indicator device connected to the microcontroller, and a delay knob connected to the microcontroller, where the microcontroller and the infrared remote library are configured to, upon selection of a switch position at the at least one switch, control the infrared light emitter to emit repetitive infrared control codes at the content device at a repetition rate responsive to at least a reaction time for switching the selection function at the content device, the repetitive infrared control codes automatically incrementing or decrementing the selection function at the content device, where the delay knob is configured to set the repetition rate, and where the indicator device is configured to indicate emissions from the infrared light emitter. In implementations, the remote control further including an infrared receiver configured to capture infrared emissions with the control codes from a content device remote control. In implementations, the at least one switch is a channel up and down switch and the selection function is channel selection. In implementations, the at least one switch further includes an audio control knob and the selection function is volume control. In implementations, the at least one switch further includes a manual channel up and down switch configured to singly increment or decrement upon entry by a user. In implementations, the indicator device is a user perceivable spectrum light emitter. In implementations, the at least one switch is two switches, the two switches including a channel up and down switch and the selection function is channel selection, and an audio control knob and the selection function is volume control, where the repetition rate includes time for automatically controlling adjustment of the volume control by transmitting repetitive infrared control codes using the audio control knob at each switched to channel.

In general, a method for automatically switching content selection at a distribution device using a remote control, the method including programming a remote control with command codes of a distribution device, transmitting recurring infrared command codes toward the distribution device by positioning a switch at the remote control for content selection at the distribution device, indicating transmission of the repetitive infrared command codes by emitting testing personnel perceivable emissions at the remote control, and adjusting a wait period between the transmissions of the repetitive infrared control codes in response to switching times at the distribution device. In implementations, the method further including obtaining, using a receiver in the remote control, the command codes from the distribution device, where the programming is automatically done after obtainment of the command codes. In implementations, the adjusting the wait period further including adjusting the wait period to check other content selections at a selected content selection. In implementations, the switch is a channel up and down switch and the content selection is a channel selection. In implementations, the switch further includes a volume knob, the method further including transmitting recurring infrared command codes toward the distribution device by turning the volume knob to adjust volume. In implementations, the transmitting recurring infrared command codes toward the distribution device by turning the volume knob to adjust volume is done during the wait period. In implementations, the switch further includes a manual channel up and down switch, the method further including transmitting an infrared command code toward the distribution device by positioning the manual channel up and down switch at the remote control for singular channel selection at the distribution device, where the transmitting recurring infrared command codes toward the distribution device is halted. In implementations, the method further including positioning the channel up and down switch to a neutral position.

In general, a device including a controller including a remote library and programmed with channel commands associated with a media delivery device, a control button connected to the controller, the control button associated with at least one channel command to change a channel at the media delivery device, an infrared light emitting device connected to the controller, the infrared light emitting device configured to repeatedly emit infrared channel commands to automatically change channels at the media delivery device in response to the controller, the remote library, and the control button, and a transmission rate adjuster connected to the controller, the transmission rate adjuster configured to set a transmission rate for the infrared light emitting device. In implementations, the device further including an infrared receiver configured to capture the channel commands from the media delivery device for programming the device. In implementations, the device further including a visible light emitting device connected to the controller, the visible light emitting device configured to emit in accordance with emissions from the infrared light emitting device. In implementations, the device further including a second control button connected to the controller, the second control button associated with the at least one channel command to change the channel at the media delivery device, wherein the infrared light emitting device configured to emit an infrared channel command to change one channel at a time at the media delivery device in response to the controller, the remote library, and the second control button. In implementations, the device further including a third control button connected to the controller, the third control button associated with channel commands to change the volume at the media delivery device.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A remote control comprising:
    a microcontroller;
    an infrared remote library provisioned on the microcontroller, wherein the microcontroller and infrared remote library are programmed with control codes for at least one content device;
    at least one switch connected to the microcontroller, each switch associated with a selection function on the content device and each switch having at least one control code;
    an infrared light emitter connected to the microcontroller;
    an indicator device connected to the microcontroller; and
    a delay knob connected to the microcontroller,
    wherein the microcontroller and the infrared remote library are configured to, upon selection and setting of an automatic switch position at the at least one switch in contrast to a manual channel up and down button, wherein the automatic switch is a separate switch than the manual channel up and down button, automatically control the infrared light emitter to emit repetitive infrared control codes at the content device at a repetition rate responsive to and incorporates at least a reaction time for switching the selection function at the content device so that the repetitive infrared control codes are automatically incrementing or decrementing the selection function at the content device without further setting of the automatic switch, the automatic switch position reducing repetitive stress injuries of having to press remote control buttons multiple times while checking selection functionality at the content device,
    wherein the delay knob is configured to set the repetition rate, and
    wherein the indicator device is configured to indicate emissions from the infrared light emitter.

2. The remote control of claim 1, further comprising:
    an infrared receiver configured to capture infrared emissions with the control codes from a content device remote control.

3. The remote control of claim 1, wherein the at least one switch is an automatic channel up and down switch and the selection function is channel selection, the automatic channel up and down switch configured to be set in one of an up channel position, a neutral position, and a down channel position and wherein channels are automatically incremented when in the up channel position and channels are channels are automatically decremented when in the down channel position in contrast to singly increment or decrement upon entry by a user using the manual channel up and down button.

4. The remote control of claim 3, wherein the at least one switch further comprises:
    an automatic audio control knob and the selection function is volume control, the automatic audio control knob configured to cycle through volumes at each automatically selected channel.

5. The remote control of claim 1, wherein the manual channel up and down button is configured to singly increment or decrement upon entry by a user.

6. The remote control of claim 5, wherein the indicator device is a user perceivable spectrum light emitter.

7. The remote control of claim 1, wherein the at least one switch is two switches, the two switches comprising:
    an automatic channel up and down switch and the selection function is channel selection; and
    an automatic audio control knob and the selection function is volume control,
    wherein the repetition rate includes time for automatically controlling adjustment of the volume control by transmitting repetitive infrared control codes using the audio control knob at each switched to channel.

8. A method for automatically switching content selection at a distribution device using a remote control, the method comprising:
    programming a remote control with command codes of a distribution device;
    transmitting recurring infrared command codes toward the distribution device by positioning and setting an automatic switch without further setting of the automatic switch at the remote control for automatic content selection at the distribution device, wherein the automatic switch is a separate switch than a manual channel up and down button, wherein the positioning reducing repetitive stress injuries of having to press remote control buttons multiple times while checking selection functionality at the content device;
    indicating transmission of the repetitive infrared command codes by emitting testing personnel perceivable emissions at the remote control; and
    adjusting a wait period between the transmissions of the repetitive infrared control codes in response to switching times at the distribution device.

9. The method of claim 8, further comprising:
    obtaining, using a receiver in the remote control, the command codes from the distribution device, where the programming is automatically done after obtainment of the command codes.

10. The method of claim 8, wherein the adjusting the wait period further comprising:
    adjusting the wait period to check other automatic content selections at a selected content selection, wherein the automatic content selections are absent causation of repetitive stress injuries to a user.

11. The method of claim 8, wherein the automatic switch is an automatic channel up and down switch and the content selection is a channel selection, the automatic channel up and down switch configured to be set in one of an up channel position, a neutral position, and a down channel position.

12. The method of claim 11, wherein the switch further comprises a volume knob, the method further comprising:

transmitting recurring infrared command codes toward the distribution device by turning the volume knob to adjust volume.

13. The method of claim 12, wherein transmitting recurring infrared command codes toward the distribution device by turning the volume knob to adjust volume is done during the wait period.

14. The method of claim 11, the method further comprising:
transmitting an infrared command code toward the distribution device by positioning the manual channel up and down button at the remote control for singular channel selection at the distribution device, wherein the transmitting recurring infrared command codes toward the distribution device is halted.

15. The method of claim 14, further comprising:
positioning the automatic channel up and down switch to a neutral position.

16. A device comprising:
a controller including a remote library and programmed with channel commands associated with a media delivery device;
an automatic control button connected to the controller, the automatic control button associated with at least one channel command to automatically and repeatedly change a channel at the media delivery device without further setting of the automatic control button once selected and set, wherein the automatic control button is a separate button than the manual channel up and down button, the automatic control button reducing repetitive stress injuries of having to press device buttons multiple times while checking selection functionality at the media delivery device;
an infrared light emitting device connected to the controller, the infrared light emitting device configured to repeatedly emit infrared channel commands to automatically change channels at the media delivery device in response to the controller, the remote library, and the automatic control button; and
a transmission rate adjuster connected to the controller, the transmission rate adjuster configured to set a transmission rate for the infrared light emitting device.

17. The device of claim 16, further comprising:
an infrared receiver configured to capture the channel commands from the media delivery device for programming the device.

18. The device of claim 16, further comprising:
a visible light emitting device connected to the controller, the visible light emitting device configured to emit in accordance with emissions from the infrared light emitting device.

19. The device of claim 16, further comprising:
the manual control button connected to the controller, the manual control button associated with the at least one channel command to change the channel at the media delivery device, wherein the infrared light emitting device configured to emit an infrared channel command to change one channel at a time at the media delivery device in response to the controller, the remote library, and the manual control button.

20. The device of claim 19, further comprising:
an audio control button connected to the controller, the audio control button associated with channel commands to change the volume at the media delivery device.

* * * * *